United States Patent
Kim (10) Patent No.: US 11,801,890 B2
(45) Date of Patent: Oct. 31, 2023

(54) APPARATUS AND METHOD FOR CONTROLLING MOTOR DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 88 days.

(21) Appl. No.: 17/369,926

(22) Filed: Jul. 7, 2021

(65) Prior Publication Data
US 2022/0009550 A1    Jan. 13, 2022

(30) Foreign Application Priority Data
Jul. 13, 2020    (KR) .................. 10-2020-0086020

(51) Int. Cl.
| | | |
|---|---|---|
| B62D 6/00 | (2006.01) | |
| B60W 60/00 | (2020.01) | |
| B62D 5/04 | (2006.01) | |

(52) U.S. Cl.
CPC ............. *B62D 6/00* (2013.01); *B60W 60/001* (2020.02); *B62D 5/0463* (2013.01)

(58) Field of Classification Search
CPC ........ B62D 6/00; B62D 5/0463; B62D 1/283; B62D 1/286; B62D 15/025; B62D 6/007;
(Continued)

(56) References Cited

U.S. PATENT DOCUMENTS

2018/0057009 A1    3/2018  Maeda
2019/0054950 A1*   2/2019  Farhat .................. G05D 1/0061
(Continued)

FOREIGN PATENT DOCUMENTS

| CN | 109204446 | 1/2019 |
| CN | 111098918 | 5/2020 |
| KR | 10-2017-0065793 | 6/2017 |

OTHER PUBLICATIONS

English Language Abstract of KR 10-2017-0065793 published Jun. 14, 2017.
(Continued)

*Primary Examiner* — Scott A Reinbold
(74) *Attorney, Agent, or Firm* — DLA PIPER LLP (US)

(57) ABSTRACT

Provided are an apparatus and a method for controlling a motor driven power steering system. The apparatus may include an MDPS basic logic unit configured to determine a first auxiliary command current in a manual driving mode of a vehicle, an autonomous driving steering control unit configured to determine a second auxiliary command current in an autonomous driving mode, a filter unit configured to filter the column torque so that noise torque is removed, and a control unit configured to control whether to activate the filter unit according to whether a predefined sudden steering condition is satisfied, to determine a driver's steering intervention based on selectively filtered column torque, to determine a final auxiliary command current by applying a weight to the first and second auxiliary command currents, and to control switching from the autonomous driving mode to the manual driving mode.

10 Claims, 6 Drawing Sheets

(58) Field of Classification Search
CPC ... B62D 5/046; B60W 60/001; B60W 60/005; B60W 10/20; B60W 50/082; B60W 60/0053; B60W 2050/0022; B60W 2050/0052; G05D 1/0061; G05D 2201/0213
USPC .......................................................... 180/446
See application file for complete search history.

(56) References Cited

U.S. PATENT DOCUMENTS

| | | | |
|---|---|---|---|
| 2019/0092380 A1* | 3/2019 | Miccinilli | B62D 15/024 |
| 2019/0308661 A1* | 10/2019 | Naik | B62D 5/06 |
| 2020/0010111 A1* | 1/2020 | Tsubaki | B62D 5/0463 |
| 2020/0130727 A1* | 4/2020 | Kim | B62D 15/025 |
| 2020/0307642 A1* | 10/2020 | Tsuji | B60W 50/10 |

OTHER PUBLICATIONS

Extended European Search Report dated Dec. 3, 2021 issued in EP 21184212.5.
English Language Abstract of CN 109204445 dated Jan. 15, 2019.
English Language Abstract of CN 111098918 dated May 5, 2020.

* cited by examiner

APPARATUS AND METHOD FOR CONTROLLING MOTOR DRIVEN POWER STEERING SYSTEM

CROSS-REFERENCE TO RELATED APPLICATION

This application claims priority from and the benefit of Korean Patent Application No. 10-2020-0086020, filed on Jul. 13, 2020, which is hereby incorporated by reference for all purposes as if set forth herein.

BACKGROUND

Field

Exemplary embodiments of the present disclosure relate to an apparatus and a method for controlling a motor driven power steering system, and more particularly, to an apparatus and a method for controlling a motor driven power steering system, which control an MDPS motor in consideration of an autonomous driving mode and a manual driving mode of a vehicle.

Discussion of the Background

Power steering of a vehicle is a steering device based on power and serves to assist a driver in operating a steering wheel. Such power steering mainly uses hydraulic pressure, but recently, the use of a motor driven power steering (MDPS) system using the power of a motor is increasing. This is because the MDPS system has advantages in that it is light, occupies less space, and does not require oil exchange as compared with the existing hydraulic power steering system.

The MDPS system judges vehicle driving conditions through a torque sensor that measures the steering torque of a driver inputted to a steering wheel, a steering angle sensor that measures a steering angle or a steering angular speed of the steering wheel, a vehicle speed sensor that measures a vehicle speed, and the like, and provides auxiliary torque through an electric motor on the basis of the steering torque applied to a steering shaft as the driver steers the steering wheel.

Meanwhile, an autonomous vehicle recognizes environments of a road, on which the vehicle is running, through an autonomous driving module (a camera sensor, a radar sensor, a LiDAR sensor, and the like) in an autonomous driving mode, and determines a command steering angle and command torque required for an operation of the MDPS system, thereby controlling the operation of the MDPS system applied to the autonomous vehicle.

At this time, there may occur a situation in which a driver needs to steer a steering wheel at his/her will as needed such as the occurrence of sudden failure in the autonomous driving module and requirement of manual steering for emergency avoidance driving. In such a case, when steering torque is maintained at a predetermined level or more for a predetermined time, the MDPS system in the related art has operated to cancel the autonomous driving mode by judging that driver's steering intervention has occurred. However, the method for judging the driver's steering intervention in the related art has a limitation that a predetermined time needs to be maintained unconditionally regardless of steering torque applied by a driver. Therefore, the method has a limitation that it is not possible to quickly cancel the autonomous driving mode and enter a manual driving mode during sudden steering.

In addition, when the position control of the MDPS according to the autonomous driving mode is continuously performed although a driver forcibly steers a steering wheel, since the vehicle is not controlled as intended by the driver, which may cause a serious accident. Therefore, in the related art, a method of judging driver's steering will through the magnitude of column torque, or the amount of phase difference between a steering angle sensor and a motor angle sensor has been considered. However, even in such a case, due to the driver's sudden steering in the process of performing the position control of the MDPS according to the autonomous driving mode, a motor control current is greatly changed, which may cause a sense of difference in the driver's steering. That is, when a mode is switched from the autonomous driving mode to the manual driving mode, instantaneous control stability is reduced due to the output difference in each mode control situation, which may lead to a sense of difference such as abnormal vehicle behavior and steering vibration.

The background art of the present disclosure is disclosed in Korean Patent Application Laid-Open No. 10-2017-0065793 (published on Jun. 14, 2017).

SUMMARY

The present disclosure has been made to solve the above problems, and an object according to one aspect of the present disclosure is to provide an apparatus and a method for controlling a motor driven power steering system, which enable quick cancellation of an autonomous driving mode and entry into a manual driving mode during sudden steering by solving the problems of the MDPS system in the related art that a predetermined time needs to be unconditionally required when a mode is switched from the autonomous driving mode to the manual driving mode, and simultaneously can remove the problem of instantaneous control stability reduction for the MDPS due to the output difference in each mode control situation, and the problem of a sense of difference such as abnormal vehicle behavior and steering vibration.

An apparatus for controlling a motor driven power steering (MDPS) system in accordance with one aspect of the present disclosure may include: an MDPS basic logic unit configured to determine a first auxiliary command current for driving an MDPS motor in a manual driving mode of a vehicle on the basis of a column torque applied to a steering column of the vehicle; an autonomous driving steering control unit configured to determine a second auxiliary command current for driving the MDPS motor in an autonomous driving mode of the vehicle; a filter unit configured to filter the column torque so that noise torque caused by a mechanical mechanism of an MDPS system mounted on the vehicle is removed; and a control unit configured to control whether to activate the filter unit according to whether a predefined sudden steering condition is satisfied, to judge a driver's steering intervention on the basis of selectively filtered column torque according to whether the filter unit is activated, to determine a final auxiliary command current by applying a weight determined on the basis of the selectively filtered column torque to the first and second auxiliary command currents, and to control switching from the autonomous driving mode to the manual driving mode by driving the MDPS motor through the determined final auxiliary command current.

In the present disclosure, the control unit may judge the driver's steering intervention by using a variable reference time variably determined corresponding to the selectively filtered column torque, and judge that the driver's steering intervention has occurred when a state in which the selectively filtered column torque is equal to or greater than preset first reference torque is maintained for the variable reference time or longer.

In the present disclosure, the control unit may determine the variable reference time as a smaller value as the selectively filtered column torque is larger.

In the present disclosure, the control unit may determine the final auxiliary command current by complementarily applying the weight to each of the first and second auxiliary command currents and determine the final auxiliary command current so that a proportion of the first auxiliary command current increases as the weight increases from a low value to a high value.

In the present disclosure, the control unit may variably determine the weight according to a position of the selectively filtered column torque in a torque region that is equal to or greater than the first reference torque and equal to or less than a preset second reference torque, and determine the weight as a larger value as the selectively filtered column torque increases in the torque region.

In the present disclosure, the control unit may cancel the autonomous driving mode and switch the autonomous driving mode to the manual driving mode only when a state in which the selectively filtered column torque corresponds to the second reference torque is maintained for a preset reference time or longer.

In the present disclosure, the filter unit may filter the column torque so that the noise torque for a resonance frequency domain caused by the mechanical mechanism of the MDPS system mounted is removed.

In the present disclosure, the sudden steering condition may mean a condition in which the column torque is equal to or greater than third reference torque preset to have a value equal to or greater than the first reference torque, and when the sudden steering condition is satisfied, the control unit may deactivate the filter unit so that attenuation of column torque having a value equal to or greater than the third reference torque is compensated for, and when the sudden steering condition is not satisfied, the control unit may activate the filter unit so that the noise torque of the column torque is removed.

In the present disclosure, the filter unit may include a lead-lag compensator, and the control unit may control whether to activate the filter unit by adjusting a value of an attenuation factor applied to the lead-lag compensator.

A method for controlling a motor driven power steering (MDPS) system in accordance with one aspect of the present disclosure may include: a step in which a control unit controls whether to activate a filter unit according to whether column torque applied to a steering column of a vehicle satisfies a predefined sudden steering condition, the filter unit operating to filter the column torque so that noise torque caused by a mechanical mechanism of the MDPS system mounted on the vehicle is removed; a step in which the control unit judges a driver's steering intervention on the basis of selectively filtered column torque according to whether the filter unit is activated in an autonomous driving mode of the vehicle; a step in which, when it is judged that the driver's steering intervention has occurred, the control unit determines a weight on the basis of the selectively filtered column torque; a step in which the control unit determines a final auxiliary command current by applying the determined weight to first and second auxiliary command currents, the first and second auxiliary command currents being currents for driving an MDPS motor in a manual driving mode and the autonomous driving mode of the vehicle, respectively; and a step in which the control unit drives the MDPS motor through the determined final auxiliary command current, thereby controlling switching from the autonomous driving mode to the manual driving mode.

In accordance with one aspect of the present disclosure, the present disclosure may judge a driver's steering intervention by using a variable reference time that is actively varied according to column torque when a mode is switched from an autonomous driving mode to a manual driving mode, thereby enabling quick cancellation of the autonomous driving mode and entry into the manual driving mode during sudden steering. Furthermore, the present disclosure may optimally determine auxiliary command currents for driving an MDPS motor through a predetermined weight to control the driving of the MDPS motor, thereby ensuring control stability for the MDPS during mode switching and reducing a sense of difference such as abnormal vehicle behavior and steering vibration.

In addition, under a predetermined sudden steering condition, the present disclosure may block an operation of a filter that removes noise torque for a resonance frequency domain caused by a mechanical mechanism of an MDPS system, thereby substantially preventing a phenomenon that column torque due to a driver's sudden steering is misjudged as noise torque. Accordingly, the present disclosure may accurately judge a driver's steering intervention and, at the same time, accurately determine a weight applied to the present disclosure, thereby enabling stable control during mode switching.

DETAILED DESCRIPTION OF THE ILLUSTRATED EMBODIMENTS

Figure 2:
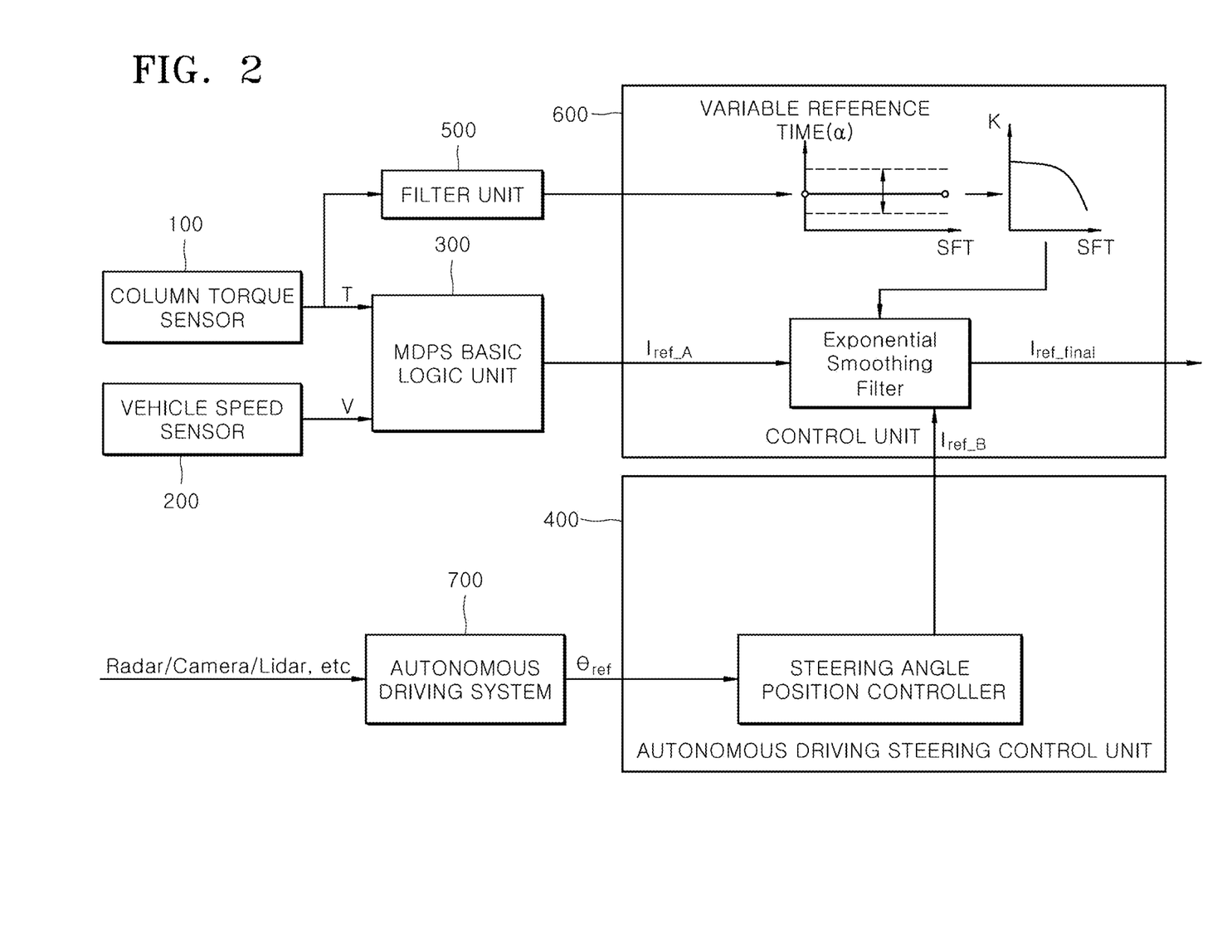
FIG. 2 is a block configuration diagram for explaining a detailed configuration of the apparatus for controlling a motor driven power steering system in accordance with an embodiment of the present disclosure.
Figure 3:
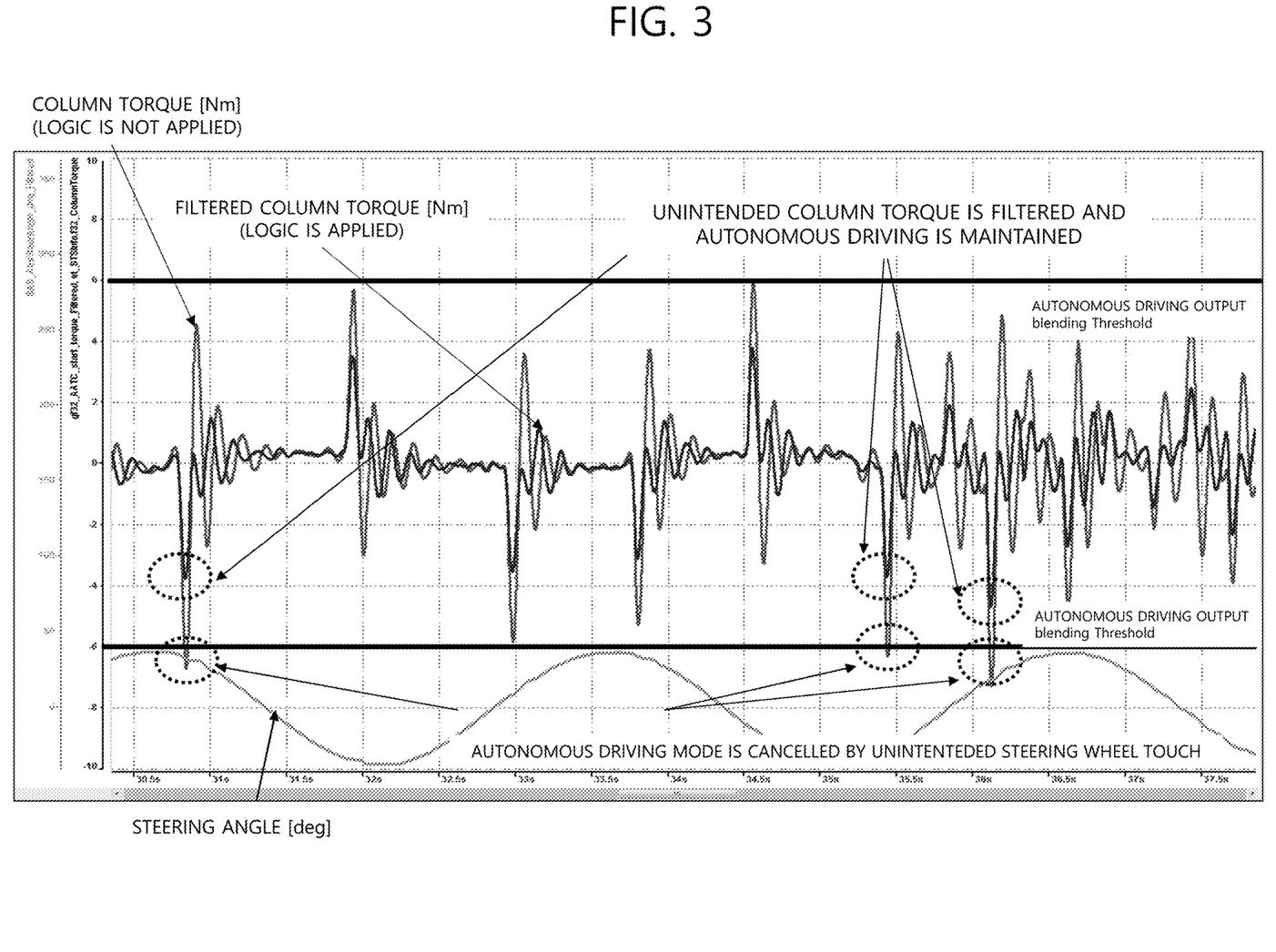
FIG. 3 is an exemplary diagram illustrating functions of a filter unit in the apparatus for controlling a motor driven power steering system in accordance with an embodiment of the present disclosure.
Figure 4:
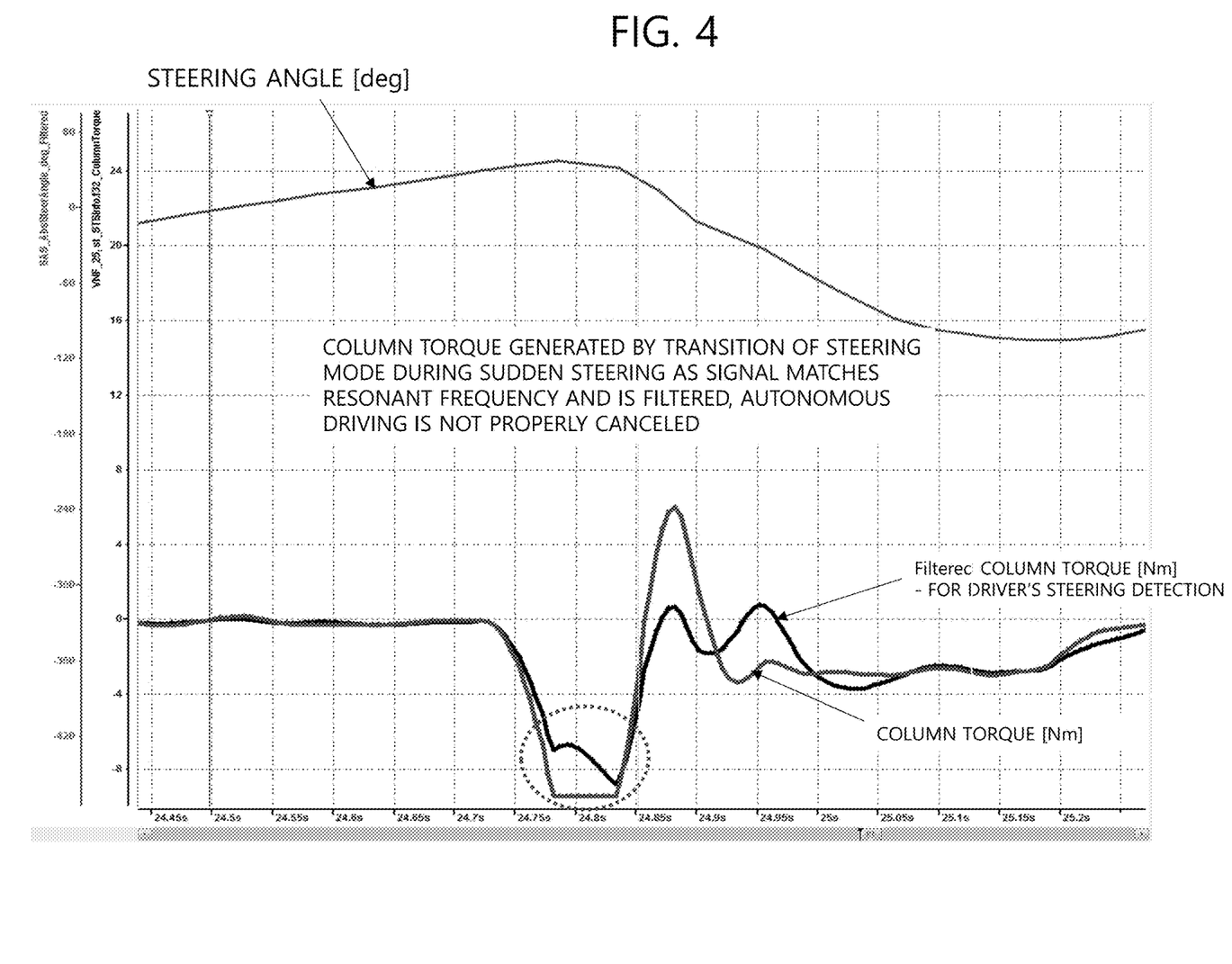
FIG. 4 and FIG. 5 are exemplary diagrams illustrating the effect when the apparatus for controlling a motor driven power steering system in accordance with an embodiment of the present disclosure controls whether to activate the filter unit.
Figure 5:
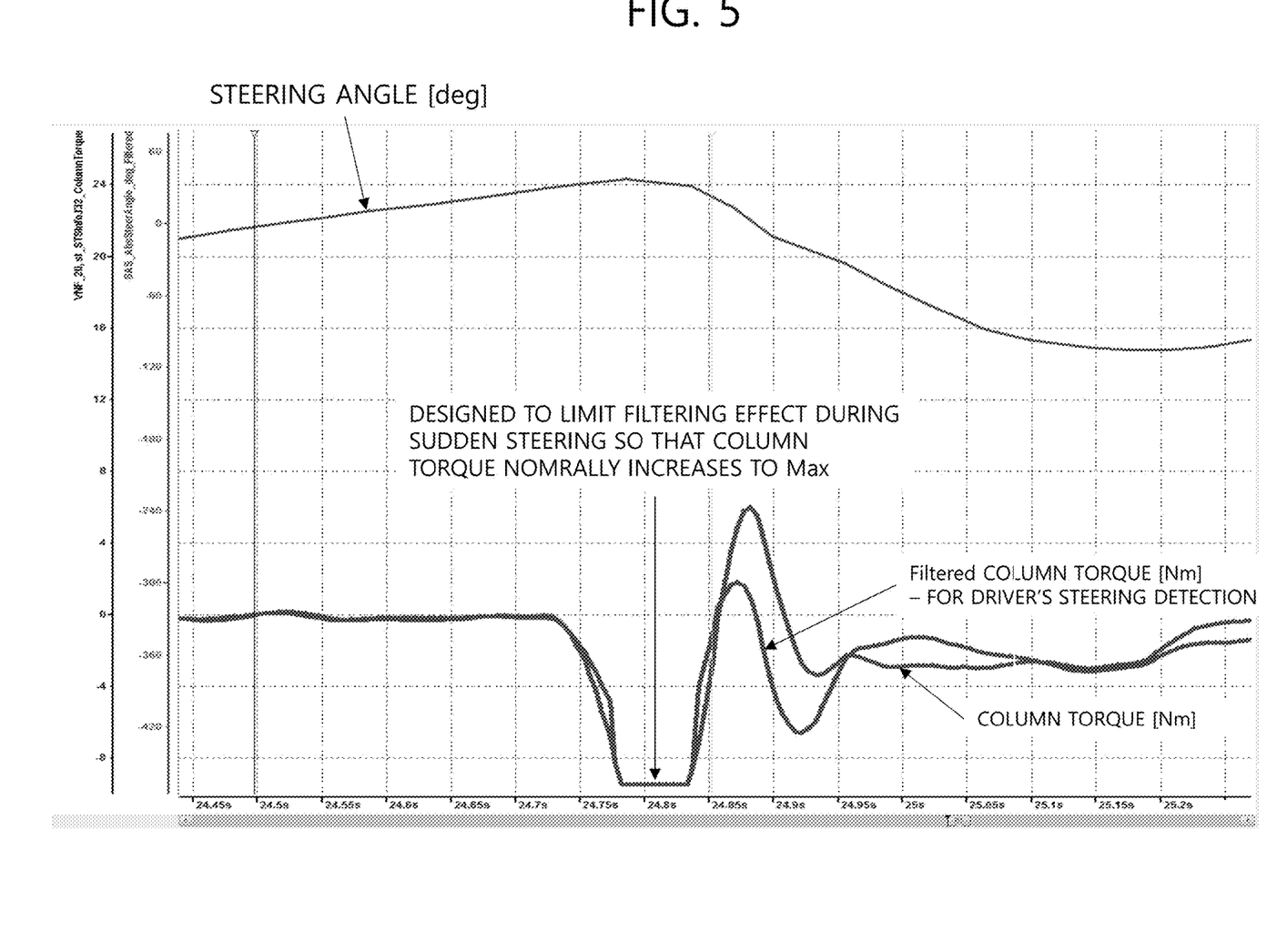

Hereinafter, embodiments of an apparatus and a method for controlling a motor driven power steering system in accordance with the present disclosure will be described below with reference to the accompanying drawings. It should be noted that the drawings are not to precise scale and may be exaggerated in thickness of lines or sizes of components for descriptive convenience and clarity only. Fur- FIG. 1 is a block configuration diagram for explaining an apparatus for controlling a motor driven power steering system in accordance with an embodiment of the present disclosure, FIG. 2 is a block configuration diagram for explaining a detailed configuration of the apparatus for controlling a motor driven power steering system in accordance with an embodiment of the present disclosure, FIG. 3 is an exemplary diagram illustrating functions of a filter unit in the apparatus for controlling a motor driven power steering system in accordance with an embodiment of the present disclosure, and FIG. 4 and FIG. 5 are exemplary diagrams illustrating the effect when the apparatus for controlling a motor driven power steering system in accordance with an embodiment of the present disclosure controls whether to activate the filter unit.

Figure 1:
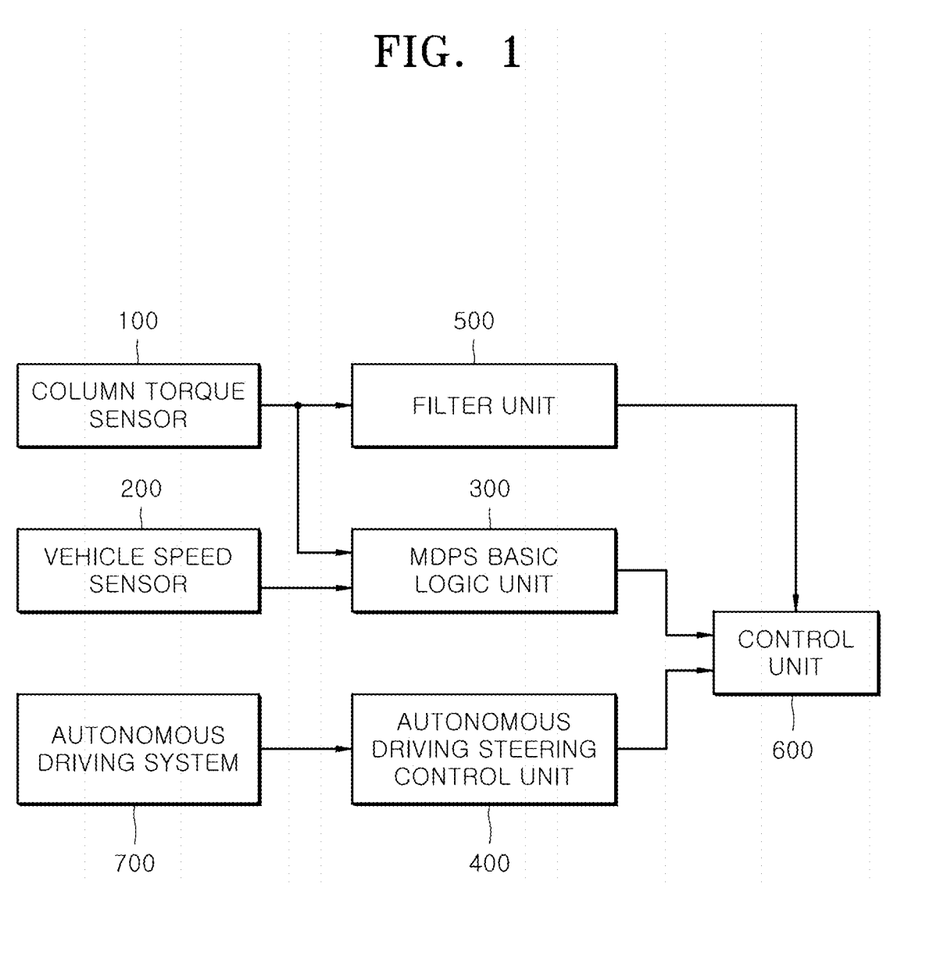
FIG. 1 is a block configuration diagram for explaining an apparatus for controlling a motor driven power steering system in accordance with an embodiment of the present disclosure.

Referring to FIG. 1, the apparatus for controlling a motor driven power steering system in accordance with an embodiment of the present disclosure may include a column torque sensor 100, a vehicle speed sensor 200, an MDPS basic logic unit 300, an autonomous driving steering control unit 400, a filter unit 500, and a control unit 600.

The column torque sensor 100 may detect column torque T applied to a steering column of a vehicle.

The vehicle speed sensor 200 may detect a vehicle speed V of the vehicle. Examples of the vehicle speed sensor 200 may include all of various sensors such as a sensor for detecting a vehicle speed using a rotational speed of a wheel, a sensor for detecting a vehicle speed by measuring a revolution per minute (RPM), and a sensor for detecting a vehicle speed using a global positioning system (GPS).

The MDPS basic logic unit 300 may determine a first auxiliary command current $I_{ref\_A}$ for driving a motor driven power steering (MDPS) motor in a manual driving mode (or manual steering mode) of a driver on the basis of the column torque T and the vehicle speed V detected by the column torque sensor 100 and the vehicle speed sensor 200, respectively. The MDPS basic logic unit 300 may determine the first auxiliary command current $I_{ref\_A}$ for driving the MDPS motor in the manual driving mode by applying a boost curve to the column torque T and the vehicle speed V. To this end, the MDPS basic logic unit 300 may include an MDPS logic section that calculates an auxiliary command current value according to the column torque T and the vehicle speed V by using the boost curve, and a motor control section that controls the MDPS motor by generating the first auxiliary command current $I_{ref\_A}$ according to the calculated auxiliary command current value.

The autonomous driving steering control unit 400 may determine a second auxiliary command current $I_{ref\_B}$ for driving the MDPS motor in an autonomous driving mode. The autonomous driving steering control unit 400 may determine the second auxiliary command current $I_{ref\_B}$ for driving the MDPS motor in the autonomous driving mode on the basis of a command steering angle $\theta_{ref}$ determined by an autonomous driving system 700 (for example, ADAS) based on a vehicle driving environment detected by sensors (for example, a radar sensor, a camera sensor, a LiDAR sensor, and the like) mounted on the vehicle, the vehicle speed V detected by the vehicle speed sensor 200, and a current steering angle of the vehicle from a steering angle sensor (not illustrated). The autonomous driving steering control unit 400 may determine the second auxiliary command current $I_{ref\_B}$ by performing the position control of the MDPS motor through proportional integral differential (PID) control based on the command steering angle $\theta_{ref}$. To this end, the autonomous driving steering control unit 400 may include a position controller and a speed controller for controlling the position and speed of the MDPS motor in the autonomous driving mode.

The filter unit 500 may filter the column torque T so that noise torque caused by the mechanical mechanism of the MDPS system mounted on the vehicle is removed. The column torque T applied to the steering column may include noise torque, which is generated in situations not intended by a driver, such as column torque in a resonance frequency domain caused by the mechanical mechanism of the MDPS system.

The noise torque corresponds to vibration in a resonance frequency domain according to the mechanical mechanism such as the steering wheel, universal joint, and torsion bar of the MDPS system, and the vibration in the resonance frequency domain may not be completely removed through a low pass filter (LPF) in the related art. Therefore, the filter unit 500 of the present embodiment may include a band stop filter, a notch filter, or a lead-lag compensator for filtering a predefined resonant frequency band (for example, 8 Hz to 10 Hz) in the column torque T in consideration of the mechanical mechanism (inertia and stiffness of the steering wheel, universal joint, and torsion bar) of the MDPS system.

The control unit 600 may control whether to activate the filter unit 500 according to whether a predefined sudden steering condition is satisfied, judge a driver's steering intervention on the basis of selectively filtered column torque according to whether to activate the filter unit 500, determine a final auxiliary command current by applying a weight determined on the basis of the selectively filtered column torque to first and second auxiliary command currents, and then control switching from the autonomous driving mode to the manual driving mode by driving the MDPS motor through the determined final auxiliary command current. The control unit 600 that performs the above operation may be implemented as an ECU that controls the MDPS system.

The control unit 600 of the present embodiment basically operates to determine the driver's steering intervention or non-intervention and the weight on the basis of the column torque filtered by the filter unit 500, that is, since the filtered column torque is a factor for judging the driver's steering intervention and determining the weight, its accuracy needs to be premised. As will be described below, the filtering function of the filter unit 500 may cause a situation in which it is not possible to detect the driver's actual steering intervention and a situation in which it is not possible to accurately determine the weight. In order to solve such problems, the present embodiment employs a configuration for controlling whether to activate the filter unit 500 (that is, controlling the ON/OFF operation of the filter unit 500). The 'selectively filtered column torque' denoted below is defined as including 'filtered column torque' corresponding to a case where the filter unit 500 is activated (the filter unit 500 is ON) and 'unfiltered column torque' corresponding to a case where the filter unit 500 is deactivated (the filter unit 500 is OFF). For clear discrimination of terms, signs are added to column torque, and the column torque detected by the column torque sensor 100 is denoted as 'column torque T' and the selectively filtered column torque is denoted as 'column torque SFT (selectively filtered torque)'.

On the basis of the above description, a configuration for judging a driver's steering intervention and a configuration for controlling mode switching will be preferentially described below and then a configuration for controlling whether to activate the filter unit 500 will be described.

1. Judgment of Driver's Steering Intervention

As described above, when column torque is maintained at a predetermined level or more for a predetermined time, the MDPS system in the related art has operated to cancel the autonomous driving mode by judging that a driver's steering intervention has occurred. However, the MDPS system has a limitation that a predetermined time needs to be maintained unconditionally regardless of the magnitude of column torque applied by a driver (that is, regardless of the urgency of manual steering). Accordingly, the MDPS system has a limitation that manual steering is not performed for a predetermined time, which causes a driver to feel great catch-up or a sense of difference, so the MDPS system may neither quickly cancel the autonomous driving mode nor enter the manual driving mode during sudden steering.

As means for solving the above problems, the present embodiment employs a configuration for judging a driver's steering intervention by using a variable reference time variably determined corresponding to the column torque SFT in the autonomous driving mode of the vehicle.

Specifically, the control unit 600 may judge that a driver's steering intervention has occurred when a state, in which the column torque SFT is equal to or greater than preset first reference torque, is maintained for the variable reference time or longer, and the variable reference time may be determined as a smaller value as the column torque SFT is larger (here, the first reference torque is a value serving as a reference in order to judge driver's steering will, and may be designed in advance according to the specifications of the MDPS system and the intention of a designer and set in advance in the control unit 600 (for example, 6 Nm)).

That is, the larger column torque SFT can be regarded as a situation in which a driver has an emergency steering intention. In such a case, since it is necessary to shorten the time required to judge steering intervention and to quickly switch a mode to the manual driving mode, the control unit 600 may operate to vary a reference time serving as the time required to judge the steering intervention. Accordingly, as illustrated in FIG. 2, the control unit 600 may determine a variable reference time α as a smaller value as the column torque SFT is larger and determine the variable reference time α as a larger value as the column torque SFT is smaller, thereby enabling quick switching to the manual driving mode in an emergency steering condition. For example, the control unit 600 may determine the variable reference time corresponding to the column torque SFT with reference to correspondence relationship information between the column torque SFT and the variable reference time, such as a mapping table (or a graph) between the column torque SFT and the variable reference time as shown in Table 1 below or a function of the variable reference time for the column torque SFT, and the correspondence relationship information between the column torque SFT and the variable reference time may be designed in advance according to the specifications of the MDPS system and the intention of a designer and set in advance in the control unit 600.

TABLE 1

| Column torque SFT | Variable reference time |
| --- | --- |
| 5 Nm | 50 ms |
| 6 Nm | 40 ms |
| 7 Nm | 30 ms |
| 8 Nm | 20 ms |
| 9 Nm | 10 ms |

By employing the variable reference time as described above, the variable reference time is reduced as the column torque SFT is larger and the time required to judge the steering intervention is shortened, which enables quicker switching to the manual driving mode. Meanwhile, as the column torque SFT converges to 0, an embodiment in which the driver's steering intervention or non-intervention is not judged may also be considered. In such a case, the reference value of the column torque SFT, by which the driver's steering intervention or non-intervention is not judged, may also be designed in advance according to the specifications of the MDPS system and the intention of a designer and reflected in the aforementioned correspondence relationship information.

The driver's steering intervention described above does not serve as a condition for cancelling the autonomous driving mode (that is, a mode switching condition), but serves as a condition for controlling the MDPS motor by adjusting the proportion of the first and second auxiliary command currents according to an exponential smoothing filter according to Equation 1 to be described below.

2. Mode Switching Control

As described above, when the driver's sudden steering occurs during the process of performing the position control of the MDPS system according to the autonomous driving mode, the motor control current is greatly changed, which may cause a sense of difference in the driver's steering. That is, when a mode is switched from the autonomous driving mode to the manual driving mode, instantaneous control stability is reduced due to the output difference in each mode control situation, which may lead to a sense of difference such as abnormal vehicle behavior and steering vibration.

As means for solving the above problems, the present embodiment employs a configuration for determining the final auxiliary command current by applying the weight determined on the basis of the column torque SFT to the first and second auxiliary command currents and then controlling switching from the autonomous driving mode to the manual driving mode by driving the MDPS motor through the determined final auxiliary command current.

First, the configuration for determining the weight will be described. The control unit 600 may variably determine the weight according to the position (that is, magnitude) of the column torque SFT in a torque region that is equal to or greater than the first reference torque and equal to or less than the second reference torque described above, and specifically, determine the weight as a larger value as the column torque SFT increases in the torque region. Determining the weight to have a larger value as the column torque SFT increases in the torque region is premised on the assumption that the final auxiliary command current is determined so that the proportion of the first auxiliary command current of the first and second auxiliary command currents constituting the final auxiliary command current increases as the weight increases from a low value from a high value as will be described below.

That is, the larger the magnitude of the column torque SFT, the greater the driver's steering will. Therefore, it is necessary to increase the proportion of a first auxiliary command current $I_{ref\_A}$ and decrease the proportion of a second auxiliary command current $I_{ref\_B}$, the first auxiliary command current $I_{ref\_A}$ and the proportion of a second auxiliary command current $I_{ref\_B}$ constituting a final auxiliary command current $I_{ref\_final}$ to be described below. To this end, the control unit 600 may determine the weight to have a larger value as the magnitude of the column torque SFT increases in the torque region that is equal to or greater than the first reference torque and equal to or less than the second reference torque.

The first reference torque corresponds to a value designed in advance according to the specifications of the MDPS system and the intention of a designer as described above (for example, 6 Nm). Meanwhile, the second reference torque may correspond to an upper limit of a torque value that may be measured by the column torque sensor 100, and may be preset in consideration of the stiffness of torsion angle of the torsion bar applied to the vehicle. For example, when the stiffness of the torsion bar is 2.5 Nm/deg and the torsion angle of the torsion bar is mechanically designed to a maximum ±8° left and right, the second reference torque may be preset to 2.5 Nm/deg*±4°=±10 Nm (10 Nm which is the absolute value of ±10 Nm). In the above example, the weight may be determined to have a value of 1 when the column torque SFT is 10 Nm, starting from a value of 0 when the column torque SFT is 6 Nm.

When the weight is determined, the control unit 600 may apply the determined weight to the first and second auxiliary command currents $I_{ref\_A}$ and $I_{ref\_B}$, thereby determining the final auxiliary command current $I_{ref\_final}$ for driving the MDPS motor when the autonomous driving mode is switched to the manual driving mode.

At this time, the control unit 600 may determine the final auxiliary command current $I_{ref\_final}$ by complementarily applying the weight to each of the first and second auxiliary command currents $I_{ref\_A}$ and $I_{ref\_B}$. Specifically, the control unit 600 may determine the final auxiliary command current so that the proportion of the first auxiliary command current increases as a weight K increase from a low value to a high value. That is, as the weight K increase from a low value to a high value, the proportion of the first auxiliary command current $I_{ref\_A}$ increases and the proportion of the second auxiliary command current $I_{ref\_B}$ decreases, which are reflected in the final auxiliary command current $I_{ref\_final}$. The final auxiliary command current $I_{ref\_final}$ may be determined through the exponential smoothing filter according to Equation 1 below.

Equation 1

$$I_{ref\_final}=KI_{ref\_A}+(1-K)I_{ref\_B}$$

According to Equation 1 above, as the K value converges to 1, the final auxiliary command current $I_{ref\_final}$ approaches the first auxiliary command current $I_{ref\_A}$ and as the K value converges to 0, the final auxiliary command current $I_{ref\_final}$ approaches the second auxiliary command current $I_{ref\_B}$.

When the column torque SFT has a value of the second reference torque (that is, when the driver's steering will and the steering will of the autonomous driving steering control unit 400 are maximally deviated within the measurement range of the column torque sensor 100), it corresponds to a situation in which the driver has will to cancel the autonomous driving mode. Therefore, the control unit 600 may set the value of the weight to 1 and cancel the autonomous driving mode in order to completely transfer the steering control right to a driver. In order to substantially prevent frequent cancellation of the autonomous driving mode, the control unit 600 may cancel the autonomous driving mode and maintain the value of the weight as 1 only when a state in which the column torque SFT corresponds to the second reference torque is maintained for a preset reference time (for example, 50 ms) or longer.

Accordingly, even when it is judged that the driver's steering intervention has occurred in the autonomous driving mode, the autonomous driving mode is not directly canceled, but the driver's steering will is reflected in the MDPS motor control with a proportion based on the weight while the autonomous driving mode is maintained. Therefore, the autonomous driving mode may be canceled and switched to the manual driving mode only in a situation in which switching to the manual driving mode is absolutely necessary while the autonomous driving mode is maintained as much as possible.

Furthermore, when a driver intends to cancel the autonomous driving mode through forced steering in the autonomous driving mode (that is, when a state in which the column torque SFT corresponds to the second reference torque is maintained for a reference time or longer), a gain (that is, 1−K in Equation 1 above) applied to the second auxiliary command current $I_{ref\_B}$ gradually decreases and a gain (that is, the weight K) applied to the first auxiliary command current $I_{ref\_A}$ gradually increases through the exponential smoothing filter according to Equation 1 described above. Therefore, the autonomous driving mode can be cancelled more naturally without a sense of difference in the steering wheel during the mode switching from the autonomous driving mode to the manual driving mode.

In a state in which the autonomous driving mode has been cancelled, when the autonomous driving mode needs to be entered by a driver, the control unit 600 may change the value of the aforementioned weight from 1 to 0. In such a case, in order to remove a driver's sense of difference in steering due to sudden entry into the autonomous driving mode, the control unit 600 may enter the autonomous driving mode from the manual driving mode by gradually changing the value of the weight from 1 to 0 for a predetermined time.

3. Control of Activation of Filter Unit

As described above, the column torque T applied to the steering column may include the noise torque, which is generated in situations not intended by a driver, such as the column torque in the resonance frequency domain caused by the mechanical mechanism of the MDPS system. As illustrated in FIG. 3, due to the noise torque irrelevant to the driver's steering will, a weight may be determined even in a situation in which it is not necessary to apply the aforementioned exponential smoothing filter, which may cause the MDPS motor to be controlled according to the final auxiliary command current according to Equation 1 above and the autonomous driving mode itself to be cancelled.

In this regard, the filter unit 500 may filter the column torque T, which is applied to the steering column, in consideration of the mechanical mechanism (inertia and stiffness of the steering wheel, universal joint, and torsion bar) of the MDPS system so that noise torque for a predefined resonant frequency band (for example, 8 Hz to 10 Hz) is removed, and the band stop filter, the notch filter, or the lead-lag compensator may be applied to the filter unit 500. Accordingly, as illustrated in FIG. 3, noise torque not intended by a driver may be removed and the autonomous driving mode may be maintained.

Meanwhile, in the present embodiment, the control unit 600 may control whether to activate the filter unit 500 according to whether a predefined sudden steering condition is satisfied, judge the aforementioned driver's steering intervention on the basis of the selectively filtered column torque SFT according to whether the filter unit 500 is activated, and determine the weight. The sudden steering condition means a condition in which the column torque T is equal to or greater than third reference torque preset to have a value equal to or greater than the first reference torque, and assuming an example in which the first reference torque is 6 Nm, the third reference torque may be preset to have a value of 8 Nm to 9 Nm (condition in which the third reference torque is equal to or less than the aforementioned second reference torque (for example, 10 Nm) may also be added as the range of the third reference torque)

Specifically, when there occurs sudden steering in which the column torque T is equal to or greater than the third reference torque, the column torque T may have a frequency characteristic similar to the resonance point of the torsion bar. In such a case, the column torque T may be attenuated due to the filtering operation of the filter unit 500, so that mode switching may not be accurately performed. That is, since the column torque T generated during the sudden steering includes many frequencies, column torque, which may be measured up to maximum 10 Nm (second reference torque) in the above example, may be measured only from 6 Nm to 7 Nm due to the operation of the filter unit 500. Accordingly, as illustrated in FIG. 4, attenuation of the column torque T by the filter unit 500 occurs during the sudden steering. As described above, since the column torque filtered by the filter unit 500 is a factor for judging the driver's steering intervention and determining the weight, the attenuation of the column torque T by the filter unit 500 during the sudden steering causes errors in the process of judging the driver's steering intervention and determining the weight.

Accordingly, when the sudden steering condition is satisfied, the control unit 600 may deactivate the filter unit 500 so that the attenuation of the column torque T having a value equal to or greater than the third reference torque is compensated for. That is, when the sudden steering condition is satisfied, the column torque T detected by the column torque sensor 100 is not affected by the filtering operation of the filter unit 500 and serves as a factor for judging the driver's steering intervention and determining the weight. Considering that it is extremely exceptional that the noise torque caused to the steering column by the torsion bar is equal to or greater than the third reference torque (for example, 10 Nm), normal mode switching control may be performed even though the filter unit 500 is deactivated under the sudden steering condition.

When the sudden steering condition is not satisfied, the control unit 600 may activate the filter unit 500 so that the noise torque of the column torque T is normally removed. That is, in the case of not a sudden steering situation, the column torque T detected by the column torque sensor 100 does not have a frequency characteristic similar to the resonance point of the torsion bar. Therefore, the control unit 600 may activate the filter unit 500 so that only the noise torque for the resonance frequency domain is normally removed from the column torque T.

Meanwhile, when the filter unit 500 includes the lead-lag compensator, the control unit 600 may control whether to activate the filter unit 500, by adjusting a value of an attenuation factor applied to the lead-lag compensator. A transfer function H(s) of the lead-lag compensator may be expressed according to Equation 2 below.

$$H(s) = H_1(s) + H_2(s) \quad \text{Equation 2}$$

$$H_1(s) = \frac{s+a}{s+\frac{a}{Y}}$$

$$H_2(s) = \frac{s+a}{s+aY}$$

(a: center frequency and Y: attenuation factor)

Accordingly, the control unit 600 may deactivate the filter unit 500 by setting the value of attenuation factor Y, which is applied to the lead-lag compensator, to 1 when the sudden steering condition is satisfied, and activate the filter unit 500 by setting the value of attenuation factor Y to a constant value converging to 0 when the sudden steering condition is not satisfied.

Figure 6:
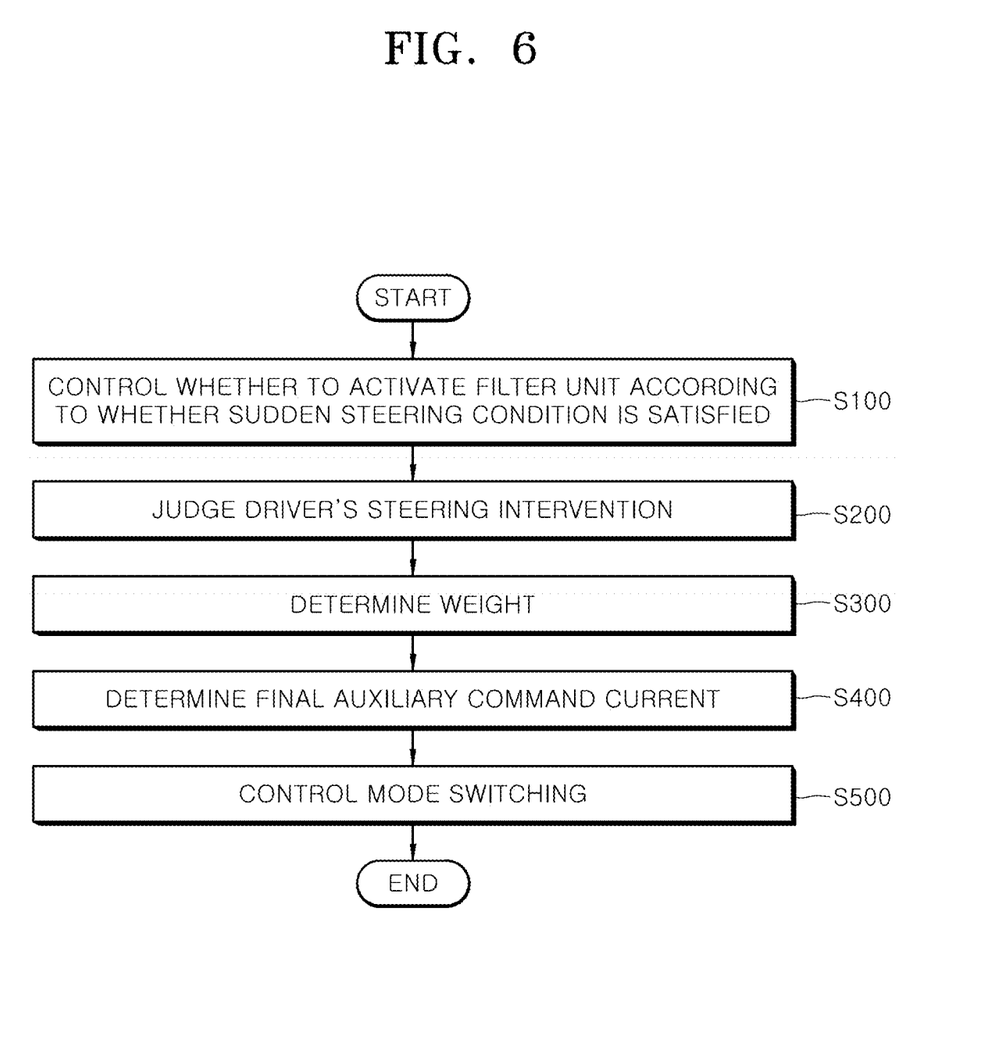
FIG. 6 is a flowchart for explaining a method for controlling a motor driven power steering system in accordance with an embodiment of the present disclosure.

FIG. 6 is a flowchart for explaining a method for controlling the motor driven power steering system in accordance with an embodiment of the present disclosure.

The method for controlling the motor driven power steering system in accordance with an embodiment of the present disclosure will be described with reference to FIG. 6. First, the control unit 600 controls whether to activate the filter unit 500 according to whether the column torque T applied to the steering column of the vehicle satisfies the predefined sudden steering condition (S100).

In step S100, when the sudden steering condition is satisfied, the control unit 600 deactivates the filter unit 500 so that the attenuation of the column torque T having a value equal to or greater than the third reference torque is compensated for, and when the sudden steering condition is not satisfied, the control unit 600 activates the filter unit 500 so that the noise torque of the column torque T is removed. When the filter unit 500 includes the lead-lag compensator, the control unit 600 may control whether to activate the filter unit 500, by adjusting the value of the attenuation factor applied to the lead-lag compensator.

Next, the control unit 600 judges a driver's steering intervention on the basis of the selectively filtered column torque SFT according to whether the filter unit 500 is activated in the autonomous driving mode of the vehicle (S200).

In step S200, the control unit 600 judges the driver's steering intervention by using the variable reference time variably determined corresponding to the selectively filtered column torque SFT, and judges that the driver's steering intervention has occurred when a state in which the selectively filtered column torque SFT is equal to or greater than the preset first reference torque is maintained for the variable reference time or longer. In such a case, the control unit 600 determines the variable reference time as a smaller value as the selectively filtered column torque SFT is larger.

When it is judged in step S200 that the driver's steering intervention has occurred, the control unit 600 determines the weight on the basis of the selectively filtered column torque SFT (S300).

In step S300, the control unit 600 variably determines the weight according to the position of the selectively filtered column torque SFT in the torque region that is equal to or greater than the first reference torque and equal to or less than the second reference torque, and specifically, determines the weight as a larger value as the selectively filtered column torque SFT increases in the torque region.

Then, the control unit 600 determines the final auxiliary command current by applying the weight determined in step S300 to the first and second auxiliary command currents (S400).

In step S400, the control unit 600 determines the final auxiliary command current by complementarily applying the weight to each of the first and second auxiliary command currents, and specifically, determines the final auxiliary command current so that the proportion of the first auxiliary command current increases as the weight increase from a low value to a high value.

Then, the control unit 600 drives the MDPS motor through the final auxiliary command current determined in step S400, thereby controlling switching from the autonomous driving mode to the manual driving mode (S500).

As described above, the present embodiment may judge a driver's steering intervention by using a variable reference time that is actively varied according to column torque when a mode is switched from an autonomous driving mode to a manual driving mode, thereby enabling quick cancellation of the autonomous driving mode and entry into the manual driving mode during sudden steering. Furthermore, the present embodiment may optimally determine auxiliary command currents for driving an MDPS motor through a predetermined weight to control the driving of the MDPS motor, thereby ensuring control stability for the MDPS during mode switching and reducing a sense of difference such as abnormal vehicle behavior and steering vibration.

In addition, under a predetermined sudden steering condition, the present embodiment may block an operation of a filter that removes noise torque for a resonance frequency domain caused by a mechanical mechanism of an MDPS system, thereby substantially preventing a phenomenon that column torque due to a driver's sudden steering is misjudged as noise torque. Accordingly, the present embodiment may accurately judge a driver's steering intervention and, at the same time, accurately determine a weight applied to the present disclosure, thereby enabling stable control during mode switching.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. An apparatus for controlling a motor driven power steering (MDPS) system, the apparatus comprising:
    an MDPS basic logic unit configured to determine a first auxiliary command current for driving an MDPS motor in a manual driving mode of a vehicle based on a column torque applied to a steering column of the vehicle;
    an autonomous driving steering control unit configured to determine a second auxiliary command current for driving the MDPS motor in an autonomous driving mode of the vehicle;
    a filter unit configured to filter the column torque so that noise torque caused by a mechanical mechanism of an MDPS system mounted on the vehicle is removed; and
    a control unit configured to control whether to activate the filter unit according to whether a predefined sudden steering condition is satisfied, to determine a driver's steering intervention based on a selectively filtered column torque according to whether the filter unit is activated, to determine a final auxiliary command current by applying a weight determined based on the selectively filtered column torque to the first and second auxiliary command currents, and to control switching from the autonomous driving mode to the manual driving mode by driving the MDPS motor through the determined final auxiliary command current,
    wherein the control unit determines the driver's steering intervention by using a variable reference time variably determined corresponding to the selectively filtered column torque.

2. The apparatus according to claim 1, wherein the control unit determines that the driver's steering intervention has occurred when a state in which the selectively filtered column torque is equal to or greater than a preset first reference torque is maintained for the variable reference time or longer.

3. The apparatus according to claim 2, wherein the control unit determines the variable reference time as a smaller value as the selectively filtered column torque is larger.

4. The apparatus according to claim 2, wherein the control unit determines the final auxiliary command current by complementarily applying the weight to each of the first and second auxiliary command currents, and determines the final auxiliary command current so that a proportion of the first auxiliary command current increases as the weight increases from a low value to a high value.

5. The apparatus according to claim 4, wherein the control unit variably determines the weight according to a position of the selectively filtered column torque in a torque region that is equal to or greater than the first reference torque and equal to or less than a preset second reference torque, and determines the weight as a larger value as the selectively filtered column torque increases in the torque region.

6. The apparatus according to claim 5, wherein the control unit cancels the autonomous driving mode and switches the autonomous driving mode to the manual driving mode only when a state in which the selectively filtered column torque corresponds to the second reference torque is maintained for a preset reference time or longer.

7. The apparatus according to claim 2, wherein the filter unit filters the column torque so that the noise torque for a resonance frequency domain caused by a mechanical mechanism of the MDPS system mounted is removed.

8. The apparatus according to claim 7, wherein the sudden steering condition indicates a condition in which the column torque is equal to or greater than a third reference torque preset having a value equal to or greater than the first reference torque, and
    when the sudden steering condition is satisfied, the control unit deactivates the filter unit so that attenuation of column torque having a value equal to or greater than the third reference torque is compensated for, and when the sudden steering condition is not satisfied, the control unit activates the filter unit so that the noise torque of the column torque is removed.

9. The apparatus according to claim 8, wherein the filter unit includes a lead-lag compensator, and
    the control unit controls whether to activate the filter unit by adjusting a value of an attenuation factor applied to the lead-lag compensator.

10. A method for controlling a motor driven power steering (MDPS) system, the method comprising:
    a step in which a control unit controls whether to activate a filter unit according to whether column torque applied to a steering column of a vehicle satisfies a predefined sudden steering condition, the filter unit operating to filter the column torque so that noise torque caused by a mechanical mechanism of the MDPS system mounted on the vehicle is removed;

a step in which the control unit determines a driver's steering intervention based on selectively filtered column torque according to whether the filter unit is activated in an autonomous driving mode of the vehicle;

a step in which, when it is determined that the driver's steering intervention has occurred, the control unit determines a weight based on the selectively filtered column torque;

a step in which the control unit determines a final auxiliary command current by applying the determined weight to first and second auxiliary command currents, the first and second auxiliary command currents being currents for driving an MDPS motor in a manual driving mode and the autonomous driving mode of the vehicle, respectively; and a step in which the control unit drives the MDPS motor through the determined final auxiliary command current, thereby controlling switching from the autonomous driving mode to the manual driving mode, wherein in the step of determining the driver's steering intervention, the control unit determines the driver's steering intervention by using a variable reference time variably determined corresponding to the selectively filtered column torque.

\* \* \* \* \*